United States Patent [19]
Kita

[11] 3,885,455
[45] May 27, 1975

[54] MECHANICAL SERVO MEANS
[75] Inventor: Yasuo Kita, Takarazuka, Japan
[73] Assignee: Sumitomo Electric Industries, Limited, Osaka, Japan
[22] Filed: Sept. 6, 1973
[21] Appl. No.: 394,901

[30] Foreign Application Priority Data
Apr. 9, 1971   Japan.......................... 46-22414

Related U.S. Application Data
[62] Division of Ser. No. 196,998, Nov. 9, 1971, Pat. No. 3,772,963.

[52] U.S. Cl................ 91/369 B; 91/37 C; 92/99
[51] Int. Cl.............................................. F15b 9/10
[58] Field of Search.......... 91/369 B, 369 A, 369 R, 91/37 C

[56] References Cited
UNITED STATES PATENTS

| | | | |
|---|---|---|---|
| 3,009,449 | 11/1961 | Rike | 91/369 B |
| 3,013,533 | 12/1961 | Brown | 91/369 B |
| 3,385,168 | 5/1968 | Fineman et al. | 91/369 B |
| 3,552,272 | 1/1971 | Parsons | 91/369 B |

*Primary Examiner*—Paul E. Maslousky
*Attorney, Agent, or Firm*—Pollock, Philpitt & Vande Sande

[57] ABSTRACT

In a mechanical servo means for boosting an input force in which resilient means is disposed between a finger plate and a fulcrum plate to provide a resiliently displaceable fulcrum point therebetween whereby the boosting ratio can be changed in accordance with the input.

2 Claims, 6 Drawing Figures

3,885,455

MECHANICAL SERVO MEANS

This is a division, of application Ser. No. 196,998, filed Nov. 9, 1971 now U.S. Pat. No. 3,772,963.

The present invention relates to a mechanical servo means and more particularly but not restrictively to a vacuum servo means adapted to be disposed for example between a master cylinder and a brake pedal for a fluid pressure brake system of an automobile for the purpose of boosting braking effect.

In an auutomobile brake system having a conventional servo means of this kind, there has been a limit in power boosting effect of the means and, once the limit is exceeded, the boosting ratio of the output to the input is abruptly decreased, giving unsteady feelings to the operator.

The present invention has an object to provide a servo means which is free from the aforementioned disadvantages of the conventional servo mechanism.

Another object of the present invention is to provide a mechanical servo means which has a lower boosting ratio under an increased pedal pressure or input than under a relatively small input, so that the ratio under an increased input becomes close to the boosting ratio when the limit is exceeded.

According to the present invention, the above objects can be achieved by an arrangement including a finger and a fulcrum plate which are forced into engagement by means of a diaphragm at variable fulcrum points, displaceable from positions in which a high boosting ratio is provided, to other positions in which a low boosting ratio is provided.

According to a further aspect of the present invention, a plurality of second positions may be provided so that said point of engagement between the finger and the fulcrum plate may be sequentially displaced to positions of sequentially decreasing boosting ratio. Thus, the present invention can provide sequentially varying power boosting ratio.

According to the present invention, it is also possible to employ the novel servo mechanism only in a rear wheel brake system for providing an optimum relation between the front wheel brake pressure and the rear wheel brake pressure.

In order to provide sequentially variable power boosting ratio by a displaceable point of engagement between the finger and the fulcrum plate, the present invention proposes to interpose a resilient member between the finger and the fulcrum plate. The resilient member provides a plurality of fulcrum points (the second position) between the finger and the fulcrum plate. As the pressure between the finger and the fulcrum plate increases, the resilient member is deformed and the fulcrum point is in effect displaced. The position of the fulcrum point, which varies as the resilient member is deformed, will determine the effective arm length of the finger so that it is possible to change the boosting ratio in accordance with the input.

The above and other objects and features of the present invention will become clear from the following descriptions taking reference to the accompanying drawings, in which.

Figure 1:
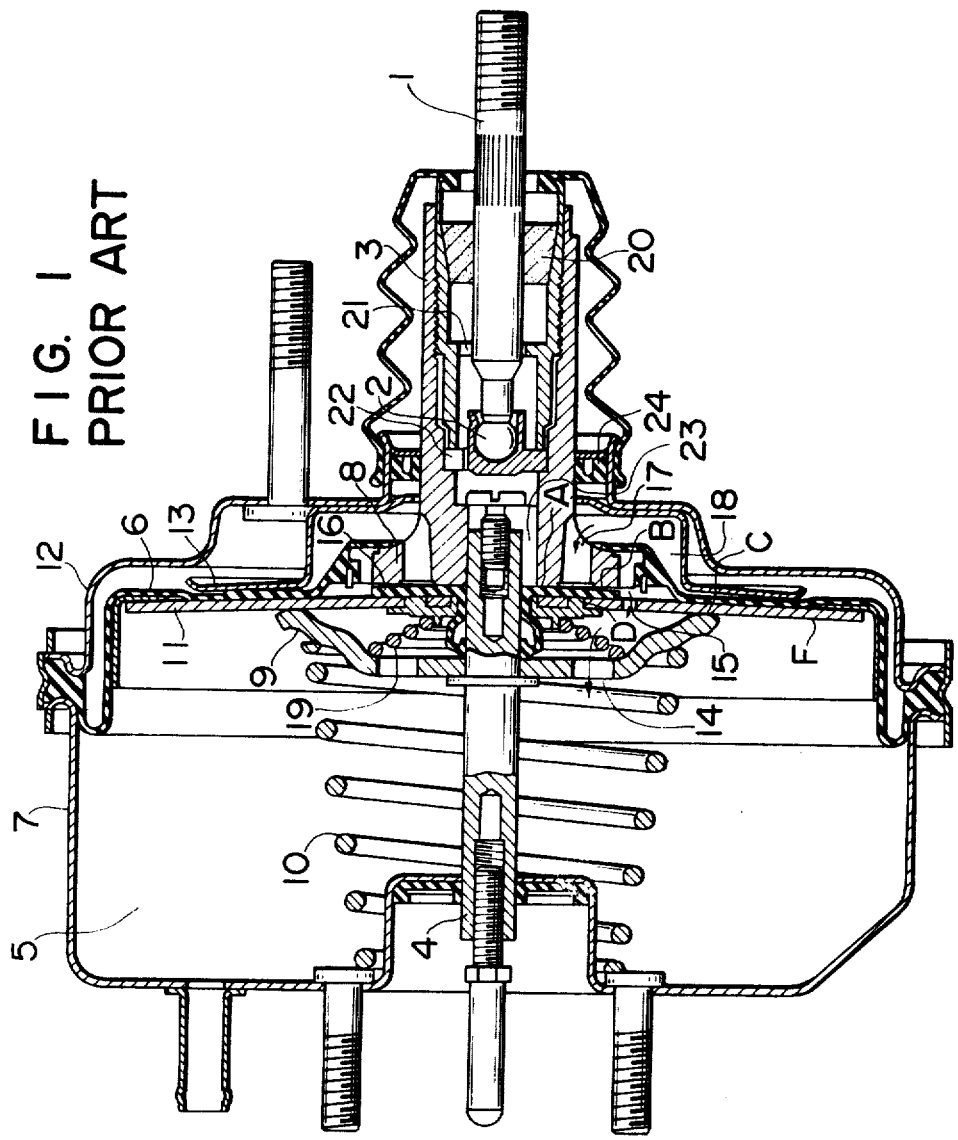
FIGS. 1 through 3 show longitudinal sectional views of a conventional arrangement in three different positions of operation.

Before the embodiments of the present invention are described, a conventional arrangement will now be explained making reference to FIGS. 1 through 3. In the known arrangement shown in FIGS. 1 through 3, there is provided an input push rod 1 which is connected through a ball joint 2 with a valve body 3. The rod 1 may be connected through a lever with a brake pedal of an automobile (not shown in the drawings). A booster push rod 4 which is co-axial with the valve body 3 and movable in the longitudinal direction is in turn connected at its left end with a master cylinder (not shown in the drawings). The arrangement provides a direct acting vacuum servo mechanism in which the force applied to the input push rod 1 is boosted by an atmospheric pressure acting on a diaphragm constituting the right-hand wall of a front chamber 5 which is connected to a vacuum source (not shown). The boosted force is then transmitted to the master cylinder.

The diaphragm 6 is a flexible disc which is in sealing connection at its outer periphery with a booster body 7 constituting the front chamber 5 and at its inner periphery with a flange 8 of the valve body 3. The diaphragm 6 is further urged by a return spring 10 interposed between a dish-shaped fulcrum plate 9 and the inner wall of the booster body 7, through a finger 11 in the form of a radially divided sector member, toward a dish-shaped rear plate 13 welded to a second booster body 12. The front chamber 5 is in communication, through holes 14 in the fulcrum plate 9, apertures 15 in the finger 11, a gap B between the flange 8 of the valve body 3 and a sealing plate 16 covering the right side surface of the center portion of the finger 11 and holes 17 in the flange 8 of the valve body 3, with a rear chamber 18. In the position shown in FIG. 1, vacuum is maintained both in the front chamber 5 and the rear chamber 18.

In the position of FIG. 1, the finger 11 is forced by the return spring 10 acting through the fulcrum plate 9 which is in contact with the finger 11 at fulcrum points shown by c in the drawing toward the diaphragm 6 and the rear plate 13. At the same time, the finger 11 is resiliently forced rightwardly at its center portion by a helical spring 19 which is supported at its one end by the right side surface of the fulcrum plate 9. The booster push rod 4 has a sealing plate 16 air tightly mounted thereon and urged onto the right hand edge (A) of the valve body under the action of the spring 19, so that the atmospheric pressure through a filter 20 and air passages 21, 22 and 23 are sealed out of the rear chamber 18 and the front chamber 5. Since the valve body 3 is held axially slidably by means of a cup-shaped seal 24 which serves to seal the gap between the cylindrical surface of the valve body and the booster body 12, the air pressure acting on the end surface of the valve body serves to force the body toward the left.

The helical spring 19 acting on the valve body 3 to force it toward the right is suitably balanced with the air pressure acting thereon to force it toward the left, so that the valve body takes the position shown in FIG. 1.

In operation of the vacuum servo means described above, the input push rod 1 is pushed toward the left to compress the spring 19. As the result, the finger 11 and the sealing plate 16 are displaced at their center portions toward the left through the position shown in FIG. 2 in which both the gaps (A) and (B) are closed by the sealing plate 16 to the position shown in FIG. 3 in which the gap (A) is opened but the gap (B) is closed. In the position of FIG. 3, the atmospheric pressure passes through the gap (A) into the rear chamber 18 to force the diaphragm 6 toward the left.

Figure 2:
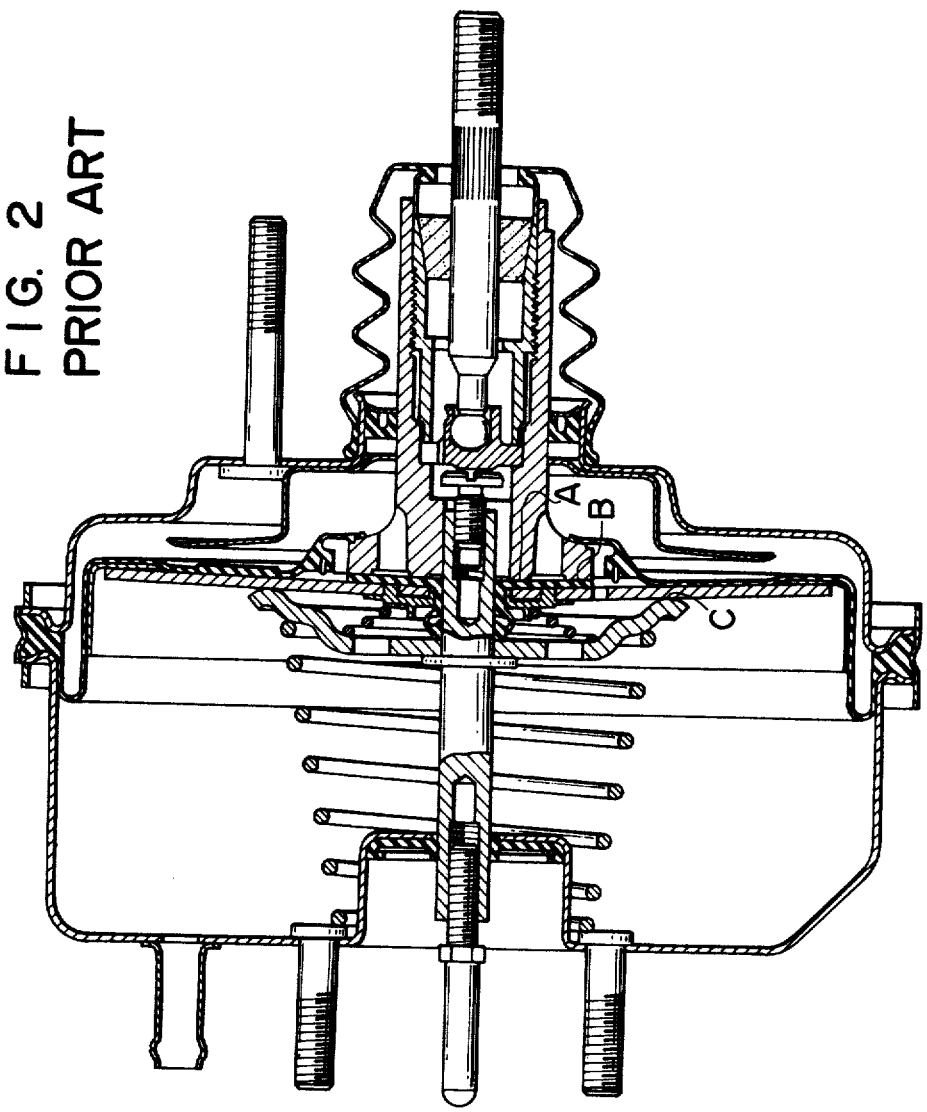

The pressure at the right side of the diaphragm 6 acts on the annular surface thereof, and, since the diphragm is so designed that the resultant force acts on such points radially outwardly deviated from the points $c$, each of the sector pieces constituting the finger 11 is pivoted about the corrsponding fulcrum points $c$ to the position shown in FIG. 2. Therefore, when the gaps (A) and (B) are closed as shown in FIG. 2, the first cycle of operation is completed. Thus, in response to the increase in the amount of leftward movement of the input push rod 1, the amount of air flow through the gap (A) increases, resulting in an increase in the pressure difference between the front chamber 5 and the rear chamber 18. In this manner, the diaphragm 6 is pushed toward the left by a distance proportional to the movement of the input push rod, so that the fulcrum plate 9 pushed by the finger 11 at the points $c$ in turn pushes the booster push rod 4 with a boosted force against the action of the return spring 10.

Figure 3:
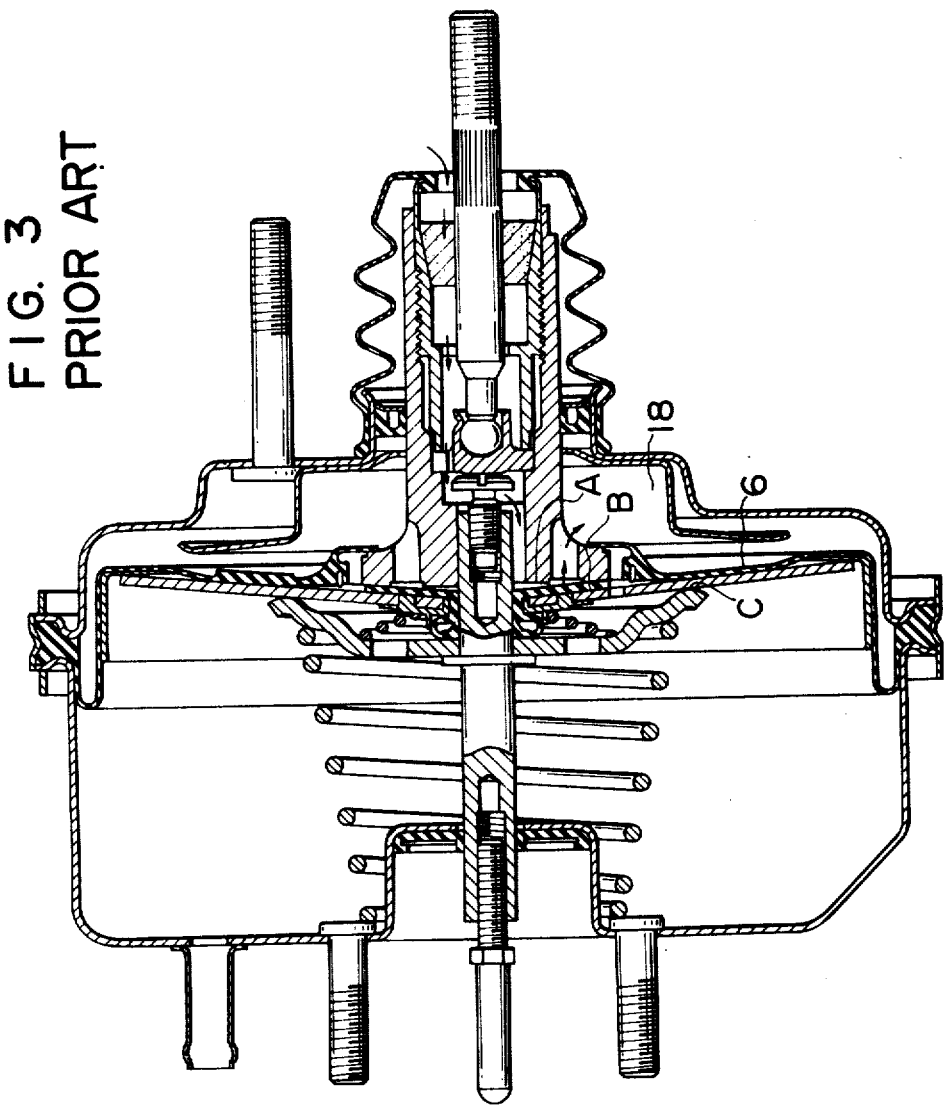

In the known arrangement shown in FIGS. 1 through 3, in order that the parts are moved from the transient position shown in FIG. 3 to the balanced position shown in FIG. 2, the resultant force acting on the diaphram 6 at the point (F) must meet the following relation.

Input Force × Distance BC/Distance FC

In this instance, the output at the booster push rod 4 becomes the sum of the resultant force on the diaphragm 6 and the input. Thus, the output can be represented by the following equation.

Output Force = Input Force × (1 + Distance BC/Distance FC)

= Input Force ( Distance BF/Distance FC )

Therefore, the boosting ratio is increased at the fulcrum point (C) comes closer to the point (F), provided that the fulcrum point (C) is located radially inwardly of the point (F).

Figure 4:
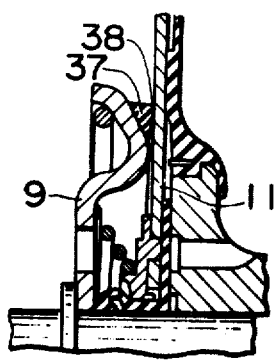
FIG. 4 is a fragmentary sectional view of a further embodiment of the present invention.

FIG. 4 shows an embodiment in which a rubber ring 37 of substantially triangular cross-section is disposed between the finger and the fulcrum plate. At an initial stage of operation in which the input is relatively small, the outermost annular edge 38 on the rubber ring 37 is in engagement with the finger 11 but, as the input increases, the rubber ring 37 is deformed. As a result, the effective fulcrum point between the rubber ring and the finger 11 gradually moves radially inwardly. Therefore, in the arrangement of FIG. 4, the boosting ratio continuously changes as long as the input is relatively small.

Figure 5:
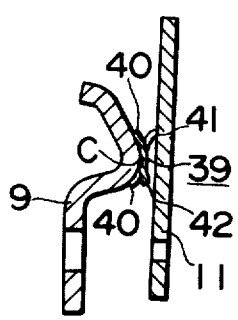
FIG. 5 is a fragmentary sectional view of a further embodiment of the present invention.
Figure 6:
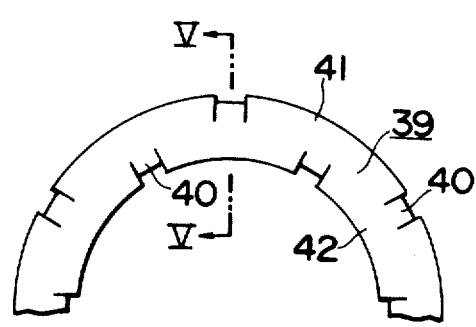
FIG. 6 is a fragmentary plan view of the embodiment shown in FIG. 5.

FIGS. 5 and 6 show another embodiment in which the boosting ratio decreases in response to the increase in the input when the input is relatively small but increases in response to the increase in the input when the input is relatively large. As in the preveious embodiment, this arrangement includes an annular metal plate 39 which is disposed between the finger 11 and the fulcrum plate 9 and has a plurality of (twelve in the case of the illustrated embodiment) finger pieces 40 formed at the inner and outer peripheries thereof by raising portions of the metal plate. The finger pieces 40 are placed in contact with the fulcrum plate 9 and the remaining portion of the metal plate 39 is slightly curved so that it contacts at its outer periphery with the finger 11 to form the second fulcrum point 41. The inner periphery of the metal plate 39 is also slightly curved toward theh finger 11 so that it comes into contact therewith, when its outer periphery is deformed, so as to provide a third fulcrum point 42.

According to the illustrated arrangement, as the input increases, the finger 11 is gradually displaced toward left as seen in FIG. 5 so that the fulcrum point on the finger 11 is sequentially moved from the point 41, through the point 42 to the first fulcrum point (C). Thus, the input is boosted at the intial stage with a relatively high ratio which is determined by the position of the second fulcrum point 41, then at the intermediate stage with a relatively low ratio which is determined by the position of the third fulcrum point 42, and thereafter at the final stage with a medium ratio which is determined by the position of the first fulcrum point (C).

As described above with reference to the preferred embodiments, the present invention enables to change the boosting ratio very easily by inserting a resilient member between a finger and a fulcrum plate, the resilient member serving to displace the fulcrum point on the finger in accordance with the input.

In the illustrated embodiments, the fulcrum point has been displaced with respect to the finger, however, it should of course be noted that the fulcrum point may be displaced with respect to the fulcrum plate.

I claim:

1. In a mechanical servo means of the type including a booster body, a valve body having a hollow portion at its end, a push rod inserted at its one end into the hollow portion of said valve body in a slidable and co-axial relation therewith, a diaphragm having an outer periphery secured to said booster body and an inner periphery secured to said valve body to form a first chamber and a second chamber in said booster body, a finger plate abutting at a portion thereof on a side wall of said diaphrgm and slidable with respect to said push rod, a fulcrum plate secured to said push rod and urged by a return spring in one direction to engage at its outer periphery with the finger plate at a first fulcrum point located radially inwardly from a point at which the resultant force of the pressure on the diaphragm acts, said valve body being provided with passage means for communicating said second chamber with atmosphere, said finger plate having means for opening and closing said passage means, said opening means being adapted also to control the communication between the first chamber and the second chamber; the improvement which comprises resilient means disposed between said finger plate and the fulcrum plate so as to form a second fulcrum point which is radially deviated from said first fulcrum point whereby an effective fulcrum is provided which is displaced from the second point to the first point when the resilient force is overcome by the force exerted by the finger plate toward the fulcrum plate, said resilient means including a rubber ring of triangular cross-section, the outermost annular edge of the rubber ring being in engagement with the finger plate to provide the second fulcrum point.

2. A mechanical servo means as defined in claim 1, wherein the outer annular edge of said rubber ring is located radially outwardly of said first fulcrum point to provide said second fulcrum point, whereby the effective fulcrum is displaced from the outer second fulcrum point to the inner first fulcrum point when the resilient force is overcome by the force exerted by the finger plate toward the fulcrum plate.

* * * * *